US005633946A

United States Patent [19]
Lachinski et al.

[11] Patent Number: 5,633,946
[45] Date of Patent: May 27, 1997

[54] METHOD AND APPARATUS FOR COLLECTING AND PROCESSING VISUAL AND SPATIAL POSITION INFORMATION FROM A MOVING PLATFORM

[75] Inventors: Theodore M. Lachinski, Andover; Louis S. Ptacek, Mound; Paul M. Blais, St. Paul; Stephen Boggs, Fridley; John W. Longfellow, St. Paul; Jeffrey M. Setterholm, Lakeville, all of Minn.

[73] Assignee: Geospan Corporation, Plymouth, Minn.

[21] Appl. No.: 550,553

[22] Filed: Nov. 3, 1995

Related U.S. Application Data

[63] Continuation of Ser. No. 246,303, May 19, 1994, abandoned.

[51] Int. Cl.⁶ ..................................... G06K 9/00
[52] U.S. Cl. .................. 382/103; 348/118; 348/153; 364/443
[58] Field of Search ................... 382/103, 104, 382/106, 154; 364/443, 450, 462, 449, 447, 460; 348/116, 119, 144, 169; 901/46, 47

[56] References Cited

U.S. PATENT DOCUMENTS

| | | | |
|---|---|---|---|
| 4,814,711 | 3/1989 | Olsen et al. | 348/116 |
| 4,857,902 | 8/1989 | Naimark et al. | 340/709 |
| 4,920,424 | 4/1990 | Hosaka et al. | 358/343 |
| 4,984,279 | 1/1991 | Kidney et al. | 382/113 |
| 5,189,402 | 2/1993 | Naimark et al. | 340/709 |
| 5,214,757 | 5/1993 | Mauney et al. | 395/161 |
| 5,251,037 | 10/1993 | Busenberg | 348/147 |
| 5,251,156 | 10/1993 | Heier et al. | 364/559 |
| 5,270,694 | 12/1993 | Naimark et al. | 345/123 |
| 5,331,413 | 7/1994 | Diner | 901/47 |
| 5,359,363 | 10/1994 | Kuban et al. | 382/103 |
| 5,398,188 | 3/1995 | Maruyama | 364/450 |
| 5,413,345 | 5/1995 | Nauck | 348/169 |
| 5,430,656 | 7/1995 | Deckel et al. | 364/443 |
| 5,490,222 | 2/1996 | Sugimoto | 382/154 |

OTHER PUBLICATIONS

John D. Bossler, Kurt Novak, and Phillip C. Johnson, *Digital Mapping on the Ground and from the Air*, Geo Info Systems, Jan. 1994.

The Ohio State University, *GPS/Imaging/GIS Project*, Dec. 1, 1991.

Harry R. Sampey, PhD, *HI-STAR, NU-METRICS, INC.*, Sep. 1988.

The Ohio State University, *GPS/Imaging/ GIS Project*, Dec. 1, 1991.

Mobile Video Services, Inc., *Company Overview*.

NU-METRICS Instrumentation, *TRASTAR II*, 1989.

Dr. Kurt Novak, *Data Collection for Multi-media GIS Using Mobile Mapping Systems*, Oct. 1993.

*Primary Examiner*—Joseph Mancuso
*Assistant Examiner*—Jayanti K. Patel
*Attorney, Agent, or Firm*—Kinney & Lange, P.A.

[57] ABSTRACT

Visual and spatial position information is collected and processed for the formation of a geographic information database. In addition, the information collected and processed can be used to update the United States Census Bureau TIGER/Line files to improve the accuracy of the files. Information collected and processed can also be used to accurately determine the spatial position of an object seen in the collected visual information. The method includes the high speed collection and correlation of video images and spatial position information.

16 Claims, 10 Drawing Sheets

STREET SEGMENT CREATION

METHOD AND APPARATUS FOR COLLECTING AND PROCESSING VISUAL AND SPATIAL POSITION INFORMATION FROM A MOVING PLATFORM

This is a continuation of application Ser. No. 08/246,303, filed May 19, 1994, now abandoned.

BACKGROUND OF THE INVENTION

The present invention relates to a method of using integrated video and spatial position information to maintain and expand information located in a geographic information system. The method includes the high speed collection of video and spatial position data as well as fast and efficient storage of the data. Such a method is of particular use in updating the United States Census Bureau TIGER/Line™ files to improve the accuracy of coordinates contained therein, add missing street and address information, and add vehicle routing data. The method may also be used to create files similar to TIGER/Line files in areas where such files do not already exist.

The TIGER/Line files are a computer readable geographic database for the United States. The original sources of the database include U.S. geological survey maps, the 1980 U.S. Census Bureau DIME files, and various other sources. While these geographic files are usable as a base for a geographic information system, they are not recommended for detailed applications which require a high degree of positional accuracy. This is because the positional accuracy of the information contained in the file is limited by the scale of the U.S. Geological Survey maps from which the files are created.

In addition, information in the TIGER/Line files is only as complete and accurate as the source documents used by the U.S. Census Bureau and errors often occur in the compilation and translation of information from source documents. Further, the information is only as current as the year in which the source documents were compiled and translated.

Because the information contained in a geographic information system such as the TIGER/Line files must be continually updated to reflect the most recent changes in the information contained therein, it is desirable to provide a method for collecting and processing video and spatial position information in a manner that allows updated attribute information to be tied to previously obtained spatial positional information.

One way in which to acquire accurate spatial position information is through the use of the Global Positioning System (GPS). The Global Positioning System is a network of satellites which constantly transmits its location at known, precise times. Since the orbital position of each satellite is known, a GPS receiver on the surface of the earth can accurately measure the time it takes for the transmitted signal to reach the receiver's location on earth. This measurement provides the distance between the satellite and the receiver. To obtain three dimensional positioning, the GPS receiver takes this measurement from each of at least four orbiting satellites. Using geometric principles, the information gathered by the GPS receiver can be used to calculate the distance of each satellite with respect to the receiver and thus calculate an accurate spatial position on earth.

While the Global Positioning System can provide accurate spatial position information, problems arise when the GPS receiver is not able to receive information from at least four orbiting satellites. This occurs when the GPS receiver is obstructed by geographic features such as canyons or bluffs as well as by man-made structures. Problems also arise when a signal transmitted by an orbiting satellite is reflected from a nearby object, giving the GPS receiver one or more incorrect readings from that satellite.

A further problem with the use of the Global Positioning System to provide spatial position information is that spatial position readings are often provided by the GPS receiver at a relatively slow rate.

SUMMARY OF THE INVENTION

The present invention provides a method for collecting and processing video and spatial position information for the formation of a geographic information database. The database can be further processed to create additional databases which can be used for a variety of application such as to provide access to video images of streets and their surroundings. In addition, the information collected and processed according to the method of the present invention can be used to update the United States Census Bureau TIGER/Line computer map files to improve the accuracy of the files and add information.

The present invention includes a collection system comprising video cameras, a GPS receiver, an inertial navigation system (INS) and a control computer. The collection system is mounted in a moving vehicle such as a van. The GPS receiver provides satellite-based spatial position information and precise time values to the control computer while the INS provides kinematic-based spatial position information to the control computer. At the same time, a video tape recorder controlled by the control computer records interleaved video images from the video cameras onto a single video tape.

Each frame of the video tape has a time code associated therewith. This time code is recorded by the control computer along with the current spatial position information provided by the GPS receiver and the INS at the time that frame is recorded. In this way, each recorded video image can be correlated with the spatial position of the camera at the time the image was recorded.

A GPS base receiver is located at a known position and provides absolute spatial position information and absolute time values from the same GPS satellites as those used by the GPS receiver in the collection system. This position information is used to remove location errors in the recorded GPS spatial position information by a process known as differential processing.

A centerline offset process is used to determine the true centerline of each street from which data was collected. The centerlines are used to create street segments in a process called street segmentation and each street segment is associated with a sequence of video images. The relationship between each segment and associated video images is stored in a database. Additional attribute information databases can be created for address location, vehicle routing and point location applications among others.

Because the method of the present invention records the spatial position at the time each video image is recorded, the video images can be later reviewed as many times as is necessary to validate the accuracy and completeness of the attributes shown therein. In addition, because the INS provides six-dimensional spatial position information, the present invention allows the location of a point to be accurately determined from any two video images containing the point.

DETAILED DESCRIPTION OF THE PREFERRED EMBODIMENTS

Figure 1:
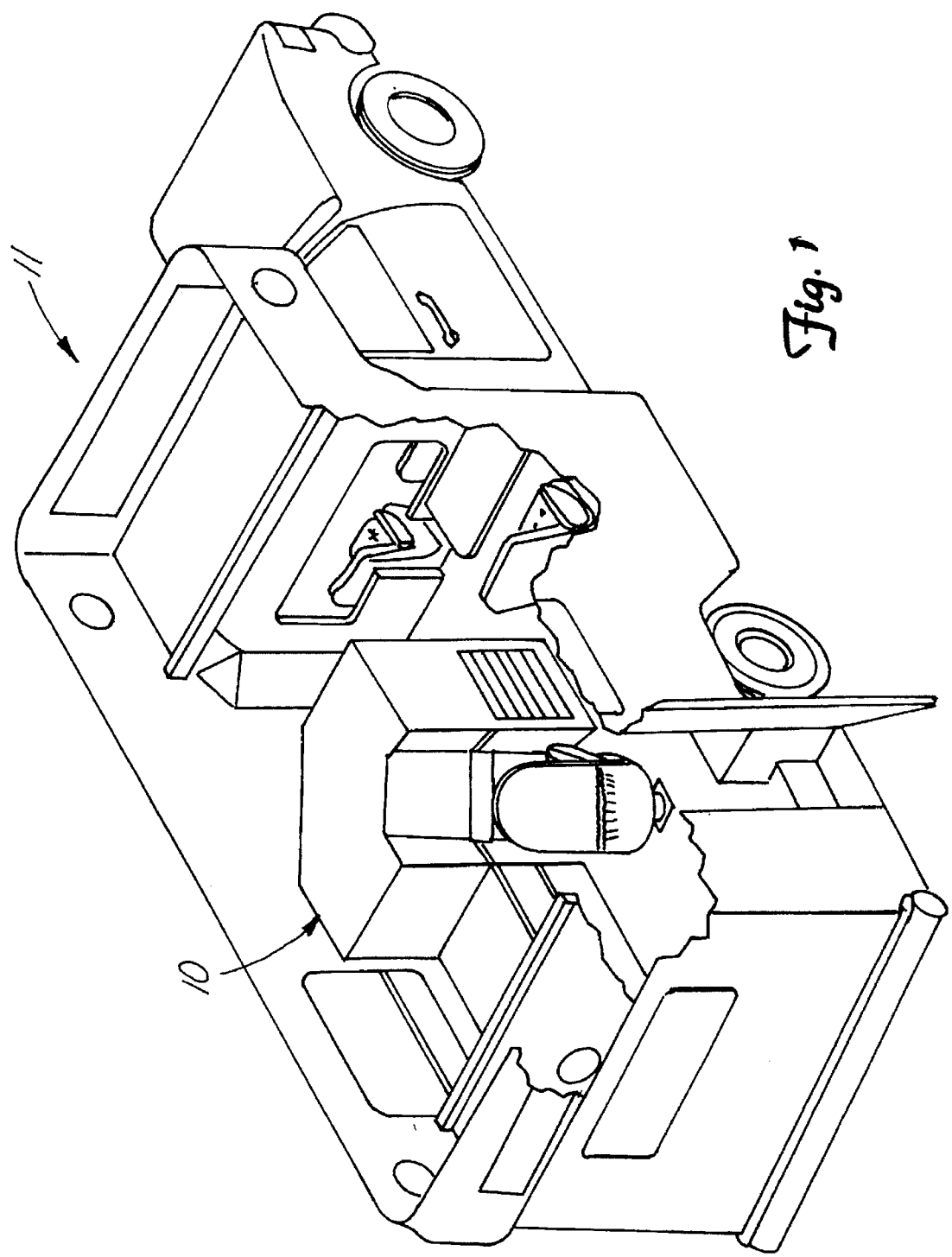
FIG. 1 is a perspective view of a vehicle in which the collection system of the present invention can be located.

In the method of present invention, accurate visual and positional information is collected in a rapid and efficient manner by a collection system 10. The information is then stored for post-collection processing, which places the data in a more easily usable form. After processing, various extraction processes are used to create a variety of geographic/informational databases. This is accomplished in part through the creation of street segments and the creation of indirect relationships between the segments and recorded video images. Generally, the collection system 10 is located on a moving platform such as a moving vehicle 11, as shown in FIG. 1.

Figure 2:
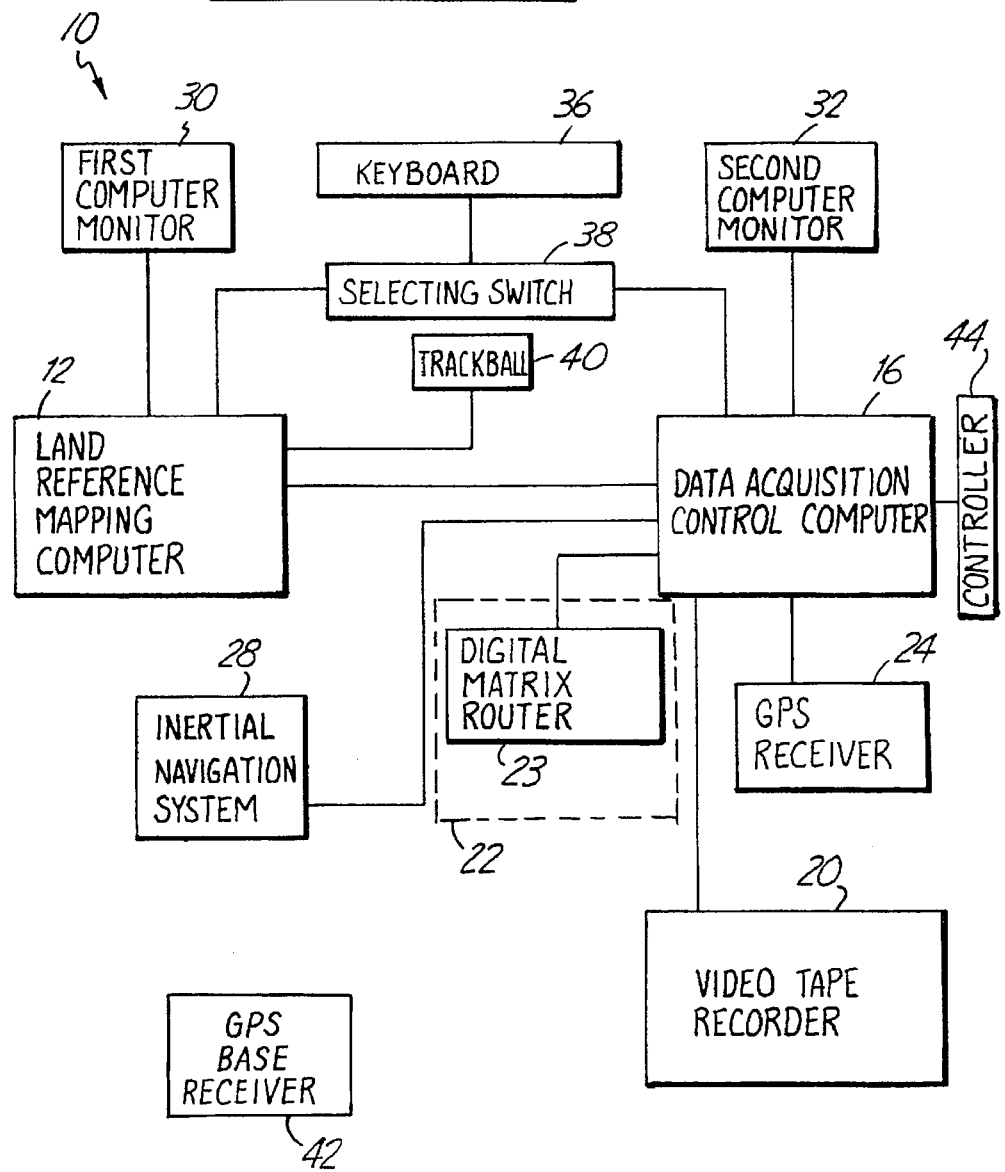
FIG. 2 is a schematic diagram showing the collection system of the present invention.

The collection system 10 for collecting video and positional information is shown in FIG. 2 and includes a land reference mapping computer 12, a data acquisition control computer 16, a video tape recorder 20, an image control system 22 including a digital matrix router 23, a GPS receiver 24 and an inertial navigation system (INS) 28. In addition, the collection system 10 includes a first computer monitor 30, a second computer monitor 32, a keyboard 36, a selecting switch 38 and a trackball 40. Each of these components are located in the moving vehicle 11. A plurality of batteries located in the vehicle 11 provide power to the collection system equipment even when the engine is not running. AC power is provided to the equipment through the use of a power inverter. The collection system 10 further includes a GPS base receiver 42 which is located at a known, fixed location separate from the rest of the collection system 10.

The control computer is linked with the video tape recorder 20, the digital matrix router 23, the GPS receiver 24, the INS 28 and the mapping computer 12. The keyboard 36 is selectably linked to both the control computer 16 and the mapping computer 12 through the selecting switch 38. In addition, the trackball 40 is electrically connected to the mapping computer 12. The first computer monitor 30 is linked to the mapping computer 12 while the second computer monitor 32 is linked to the control computer 16.

The data acquisition control computer 16 operates a set of nested asynchronous interrupt processing routines to provide real time control of all data acquisition equipment. The control computer 16 controls the signal routing of all data collected as well as the recording of the data by the video tape recorder 20. A video equipment controller 44 such as a Video Logic V-LAN™ controller is located in the control computer 16 and provides control of the video tape recorder 20 while it is recording. The video equipment controller 44 is linked with the video tape recorder 20 by a RS-422 serial communications link.

Both the GPS receiver 24 and the INS 28 are linked to the control computer 16 by RS-232 communications links and provide spatial position information to the computer 16. The GPS receiver 24 automatically acquires, tracks and selects the satellites to be used for position and time calculations and provides location readings to the control computer 16 at a rate of approximately three times per second. The INS 28 provides the control computer 16 with relative positional locations at the rate of thirty locations per second. The positional information or data received by the control computer 16 is transferred to a hard drive for permanent storage. Both the mapping computer 12 and the control computer 16 include a backup tape to provide for backup of the collected data.

The land reference mapping computer 12 provides real time tracking of the location of the moving vehicle 11. This is accomplished through an RS-232 communications link between the mapping computer 12 and the control computer 16, allowing positional information to be transmitted to the mapping computer 12. A street map is displayed on the first computer monitor 30 showing both the current and previous locations of the vehicle 11. The map is initially based on current U.S. Census Bureau TIGER/Line files. The mapping computer 12 thus acts as a navigation aid for routing the moving vehicle 11 during the data collection process.

Figure 3:
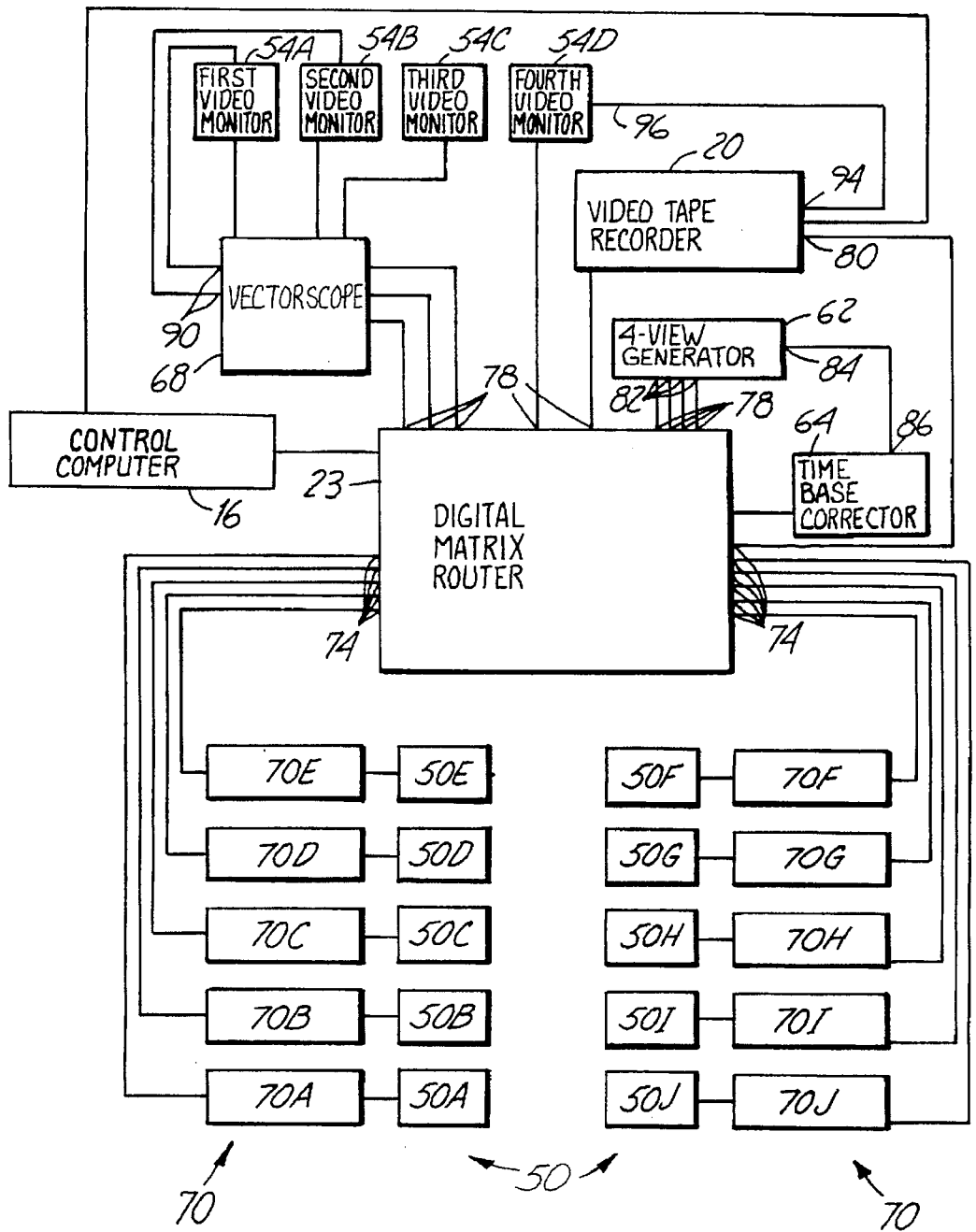
FIG. 3 is a schematic diagram showing a portion of the image collection system of the present invention.
Figure 4:
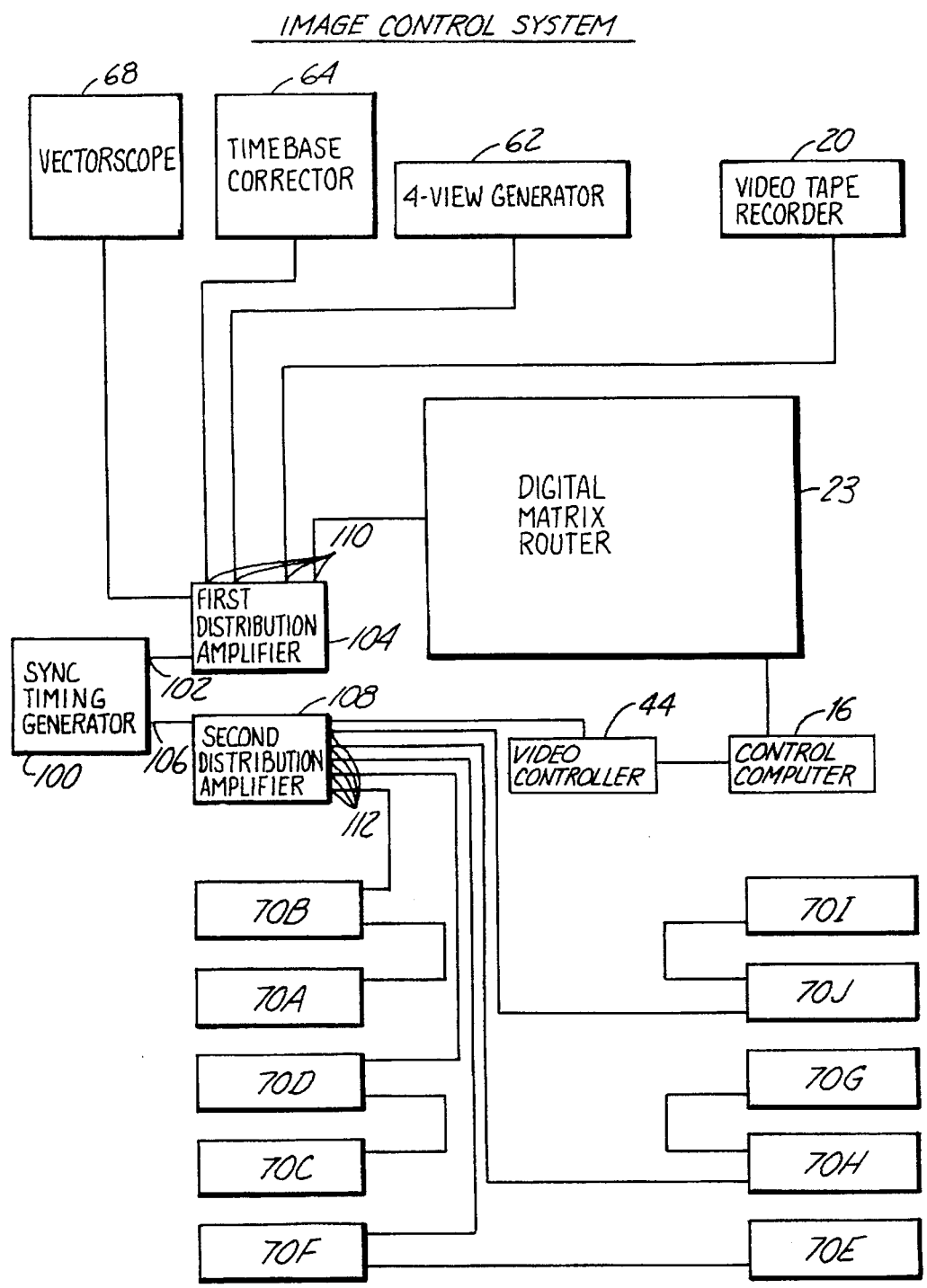
FIG. 4 is a schematic diagram showing a portion of the image collection system of the present invention.

FIGS. 3 and 4 each show a portion of the image control system 22 of the present invention, which is not completely shown in a single figure for ease of illustration. FIG. 3 shows the portion of the image control system 22 in which the video signals are routed. This portion of the image control system 22 comprises the digital matrix router 23, ten video cameras 50A, 50B, 50C, 50D, 50E, 50F, 50G, 50H, 50I and 50J (collectively referred to as 50), four video monitors 54A, 54B, 54C and 54D (collectively referred to as 54), a four-view generator 62, a time base corrector 64, a vectorscope 68 and ten video camera control units 70A, 70B, 70C, 70D, 70E, 70F, 70G, 70H, 70I and 70J (collectively referred to as 70). Each of the video cameras 50 is mounted in the moving vehicle 11 at a known position relative to the GPS receiver 24 and oriented to capture a desired view. The orientation of the video cameras 50 are as follows:

| CAMERA | VIEW |
| --- | --- |
| 50A | Driver's Front |
| 50B | Boulevard Front |
| 50C | Stereo Front |
| 50D | Right Side - Short Focal Length |
| 50E | Right Side - Long Focal Length |
| 50F | Driver's Rear |
| 50G | Boulevard Rear |
| 50H | Stereo Rear |
| 50I | Left Side - Short Focal Length |
| 50J | Left Side - Long Focal Length |

Video cameras 50B and 50G are located on remote control pan/tilt units and can be adjusted through the use of two joystick controls while cameras 50B, 50E, 50G and 50I have remote zoom and focus controls. Each video camera 50 is electrically connected to a corresponding camera control trait 70 which is used to provide normal camera head controls. Each camera control unit 70 is electrically connected to one of a plurality of inputs 74 of the digital matrix router 23 and provides a signal to the router 23. The distance between the GPS receiver 24 and each video camera 50 is measured so that the spatial position of each camera 50 can be determined from the collected spatial position information.

The digital matrix router 23 is linked to the data acquisition control computer 16 which controls the operation of the router 23. The router 23 provides at a plurality of router outputs 78 any desired combination of signals received at its inputs 74 as instructed by software located in the control computer 16. Four router outputs 78 are electrically connected to the four-view generator 62. Each of three router outputs 78 are electrically connected to first, second and third video monitors 54A, 54B and 54C, respectively, through the vectorscope 68. The two remaining router outputs 78 are electrically connected to the video tape recorder 20 and a fourth video monitor 54D respectively. Both the time base corrector 64 and a first output 80 of the video tape recorder 20 are electrically connected to router inputs 74.

The four-view generator 62 has four inputs 82, allowing signals from four of the video cameras 50 to be input simultaneously. The generator 62 reduces the image represented by each signal to one-fourth of its original size and then combines the reduced images to form a single video image by placing each of the reduced images into one of the four corners of an output image. This output image is referred to as a four-view image and is provided at an output 84 of the four-view generator 62, which is electrically connected to an input 86 of the time base corrector 64. The time base corrector 64 holds the four-view image in a buffer until the image is selected by the digital matrix router 23. This buffer is necessary because four-view images created by the four-view generator 62 require approximately one-tenth of a second to become sufficiently stable to be accurately recorded by the video tape recorder 20.

In addition to sending signals to the four-view generator 62 and to the video tape recorder 20, the digital matrix router 23 routes images from the video cameras 50 and the time base corrector 64 to the four video monitors 54. The order and duration with which each of the images is routed to the monitors 54 is determined by software in the control computer 16 which then instructs the router 23 which images to provide. The images provided by the router 23 to the first, second and third video monitors 54A, 54B and 54C are routed through the vectorscope 68. The vectorscope 68 monitors the signals from the video sources provided by the router 23 and provides those signals to the first, second and third video monitors 54A, 54B and 54C for normal video monitoring. The vectorscope 68 is used as a diagnostic source and provides diagnostic signals from two diagnostic outputs 90 to channel B of both the first video monitor 54A and the second video monitor 54B.

The video tape recorder 20 comprises a Sony PVW-2800 BetaCam SP Video Tape Recorder and is controlled by the data acquisition control computer 16. A second output 94 of the video tape recorder 20 is electrically connected to a second input 96 of the fourth video monitor 54D and provides to channel B of the monitor 54D a signal containing the video images being recorded. The video tape recorder 20 records images provided from the digital matrix router 23 on Sony Betacam SP video tapes which are generally 90 minutes in length. Each tape includes three video component tracks, two audio tracks, and a Society of Motion Picture and Television Engineers (SMPTE) time code track.

The portion of the image collection system 22 that controls the precise timing of all video equipment is shown in FIG. 4. A standard video black reference timing generator 100 is used to synchronize the timing of the image control system 22. The timing generator 100 has a first generator output 102 which is electrically connected to the input of a first six-channel distribution amplifier 104 and a second generator output 106 which is electrically connected to the input of a second six-channel distribution amplifier 108. Both the first amplifier 104 and the second amplifier 108 amplify a black reference timing signal generated by the timing generator 100 and provide the timing signal at each of six first and second amplifier outputs 110 and 112, respectively.

The first distribution amplifier 104 provides the timing signal to the video tape recorder 20, the digital matrix router 23, the four view generator 62, the vectorscope 68 and the time base corrector 64. The second distribution amplifier 108 provides the timing signal to the video equipment controller 44, the second camera control unit 70B, the fourth camera control unit 70D, the sixth camera control unit 70F, the eighth camera control unit 70H and the tenth camera control unit 70J. The first, third, fifth, seventh and ninth camera control units 70A, 70C, 70E, 70G and 70I are linked to the second, fourth, sixth, eighth and tenth camera control units 70B, 70D, 70F, 70H and 70J, respectively, to allow the timing signal to be provided to the remaining camera control units. Electrical circuitry with each video device synchronizes a National Television Standards Committee (NTSC) video blanking interval with the black reference timing signal.

Before recording on the video tape, the cable connections to the video tape recorder 20 are modified to provide a video black reference signal to the video tape recorder 20, which creates a series of individual frames on a blank tape. A time code generator built into the video tape recorder 20 provides an accurate marking of each of these video frames with a SMPTE time code. The SMPTE time codes are written on the videotape in a continuous stream of non-drop frame time codes in an hours:minutes:seconds:frame format which comprises thirty frames (0–29) per second, 60 seconds per minute and 60 minutes per hour. The marking of the video tape permits video images to be accurately recorded to the video frames during the data collection process.

The control computer 16 can send a set of instructions to the digital matrix router 23 to perform a desired continuous sequence of predetermined routings called a cycle. Instructions sent to the router 23 are timed by the video equipment controller 44. Instructions are sent by the control computer 16 to the router 23 before the NTSC video blanking interval of the desired video frame SMPTE time code and router switching commands are queued with the router 23. When the desired NTSC video blanking interval of the black reference signal is detected by the router 23, the router inputs 74 are connected to the router outputs 78 as specified by the commands from the control computer 16. The connections between the router inputs and outputs 74 and 78 are completed before the end of the NTSC video blanking interval to provide seamless switching as often as once per blanking interval.

Each of the video cameras 50 is capable of obtaining images at a rate of 30 frames per second. In addition, the digital matrix router 23 is capable of altering the routing of the signals received at its inputs 74 thirty times a second.

The video images provided at the router outputs 78 can thus be altered as frequently as thirty times per second.

Within the instructions sent to the router 23 is contained a sequence of the video cameras 50 from which video images are to be recorded by the videotape recorder 20. In this way, images from each of the video cameras 50 can be recorded in a desired order by a single video recording device. A typical 18-frame recording cycle is given as follows:

| FRAME | CAMERA VIEW | FRAME | CAMERA VIEW |
|---|---|---|---|
| 1 | 1 | 10 | 4-View 1–8 2–7 |
| 2 | 2 | 11 | 8 |
| 3 | 4 | 12 | 4 |
| 4 | 4 | 13 | 9 |
| 5 | 9 | 14 | 4-View 1–8 10–4 |
| 6 | 4-View 1–3 6–8 | 15 | 7 |
| 7 | 10 | 16 | 10 |
| 8 | 10 | 17 | 5 |
| 9 | 5 | 18 | 4-View 9–5 10–4 |

The given recording cycle is repeated continuously during the data collection process, resulting in the recording of a plurality of interleaved video images from multiple video image sources onto a recording medium. As can be seen, not only can the view from any video camera 50 be recorded, but so can any desired four-view image. The occasional recording of the same camera view for two consecutive frames provides sequential side views which can be useful in terrestrial photogrammetry.

The recording cycle shown above can be dynamically configured during recording. The computer keyboard 36 permits up to ten preset recording cycles. When a new recording cycle is selected, the control computer 16 begins the new cycle immediately after completion of the then current recording cycle. The precise timing described above permits a change in the recording cycle, as well as a change in the signals provided to the video monitors 54, to occur within a single NTSC blanking interval.

During the data collection process, which is organized into a series of "runs", the video cameras 50 continually send image signals to the digital matrix router 23 through the camera control units 70. Pursuant to instructions from the control computer 16, the router 23 provides to the video tape recorder 20 the signal from a selected one of the image sources, which include the ten video cameras 50 and the four-view generator 62. The images provided to the video tape recorder 20 are recorded at the rate of thirty per second in a predetermined order comprising a cycle. In addition, audio comments from both the driver and navigator of the moving vehicle 11 are recorded by the video tape recorder 20.

While the video tape recorder 20 is recording video images, the GPS receiver 24 acquires three dimensional fixed location data from the NASA NAVSTAR Satellite Network at selected time intervals and at selected locations. This fixed location data is provided to the control computer 16 along with the Greenwich Mean Time (GMT) transmitted by the satellites. The control computer records the location data from each positional reading provided by the GPS receiver 24, the data being given in terms of latitude, longitude and elevation. The video equipment controller 44 provides the control computer 16 with the SMPTE time code of the frame on which the video tape recorder 20 is recording for each positional reading of the GPS receiver that it receives and records. The SMPTE time code is then recorded by the control computer 16 with the corresponding set of GPS location data.

Figure 5:
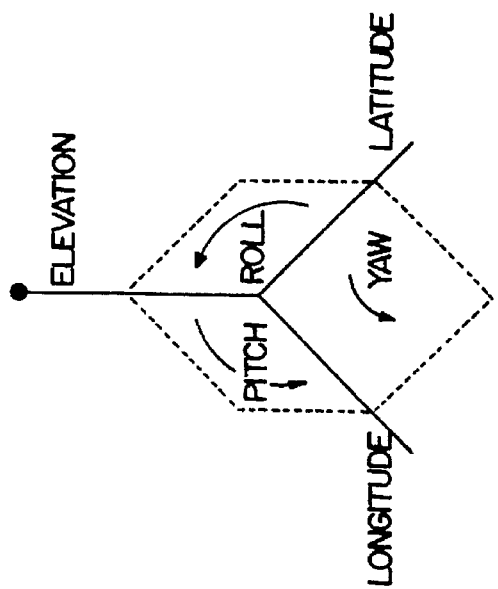
FIG. 5 shows the six-dimensional relative position of the vehicle provided by the inertial navigation system.

The inertial navigation system 28 comprises a set of rotation and acceleration sensors and continually determines the relative position of the vehicle 11 in terms of latitude, longitude, elevation, pitch, roll and yaw as shown in FIG. 5. The INS 28 can thus provides spatial position with six degrees of freedom relative to previous positional readings taken by the GPS receiver 24. The INS provides this six-dimensional relative position data at the rate of thirty times per second and the data is recorded by the control computer 16. Preferably, the INS 28 utilizes high quality laser gyroscopes which provide extremely accurate rotational/attitude data. The INS 28 can also include an odometer coupled to an undriven wheel of the vehicle 11, which reduces the need to stop for re-alignment of the INS 28.

The video equipment controller 44 provides the control computer 16 with the SMPTE time code of the frame on which the video tape recorder 20 is recording for each positional reading of the INS 28 that it receives and records. The SMPTE time code is then recorded by the control computer 16 with the corresponding set of INS position data. The recording of GPS and INS spatial position data along with the corresponding SMPTE time code allows the position data to be interpolated by SMPTE time code during post-collection processing.

By using the inertial navigation system 28, the collection system 10 of the present invention is able to collect accurate positional readings under many circumstances in which the GPS receiver 24 is unable to obtain accurate position data. This often occurs when the GPS receiver cannot obtain enough satellite signals to calculate a position and when the signals from one or more of the satellites is reflected off of a building or other surface.

If the vehicle must be stopped for an extended period of time, or if a previously recorded street must be driven again to reach a desired location, a pause command is given by the navigator to stop the recording of both video images and positional information. When it is desired to begin recording data, a resume command is given. The control computer 16 records the SMPTE time code of the last frame on which the video tape recorder 20 has recorded after the issuance of each pause command and the first frame on which recording begins after each resume command.

Figure 6:
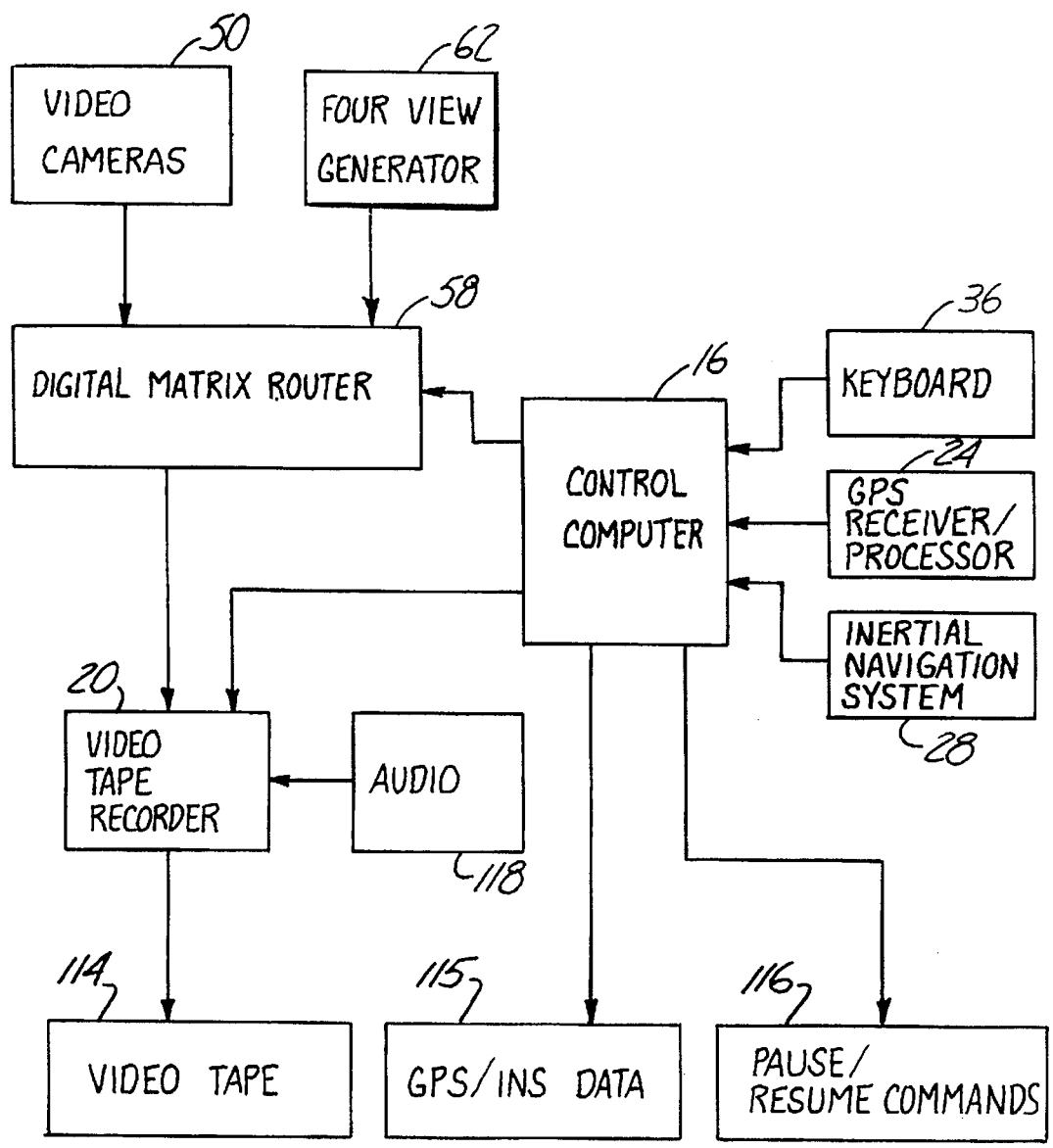
FIG. 6 is a schematic diagram showing data inputs and outputs of the collection system of the present invention.

The flow of data in the collection system during a data collection run is shown in FIG. 6. The collected data includes a video tape 114, GPS and INS spatial position data 115 and a record of each pause and resume command given 116. The video tape 114 contains all of the recorded video images as well as all audio information 118 from the driver and navigator. The video tape 114 is converted to a digital compressed format and stored in a digital video file for easy random access during post-collection processing. A correlation table is created to maintain the relationship of each digital video frame SMPTE time code with the SMPTE time code on the original video tape. The GPS and INS position data 115 provided from the GPS receiver 24 and the INS 28 is recorded to a digital file. The recorded six-dimensional spatial position data is indexed by SMPTE time code, allowing it to be correlated with each recorded video image or frame. Each set of position data also includes the corresponding GMT, which identifies when the information was collected and allows the SMPTE time codes to be indexed by GMT. The record of each pause and resume command is indexed by SMPTE time code.

During each run, the GPS base receiver 42, which is not shown in FIG. 6, collects three-dimensional position data from the NASA NAVSTAR Satellite Network at the same intervals as the GPS receiver 24 in the vehicle 11. Each set of position data is recorded in a base station file along with a corresponding GMT provided by the GPS satellites. The collection of position data by the GPS base receiver 42 must begin prior to the beginning of each run and must be continuous throughout each run. In addition, the GPS base receiver 42 must be positioned so that there are no obstructions between the receiver 42 and the GPS satellites.

Figure 7:
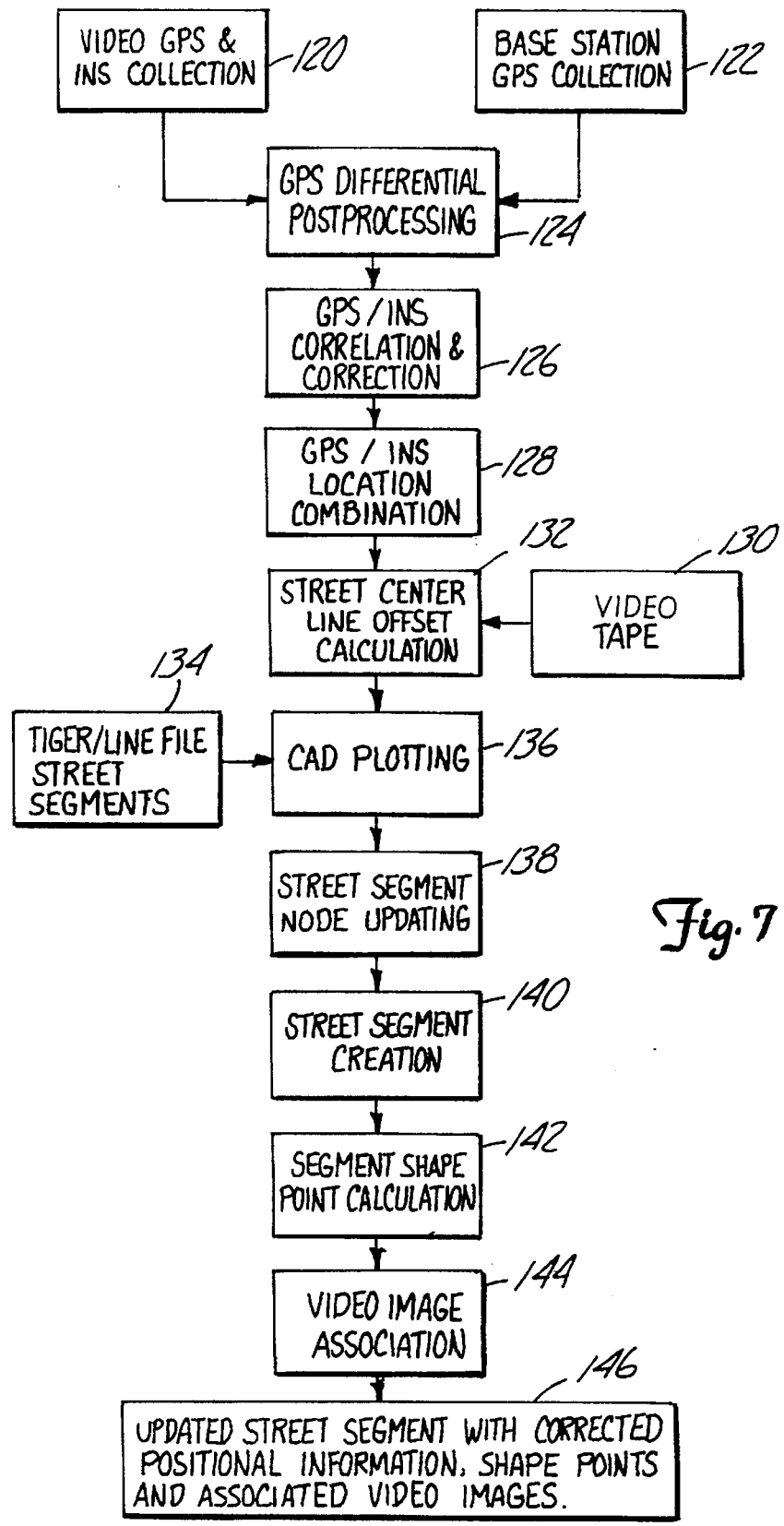
FIG. 7 shows a series of steps which are followed in the present invention.

FIG. 7 shows a sequence of steps that are performed during the method of the present invention. As described above, both visual and spatial position data is collected by the data collection system 10, as shown by box 120, and spatial position data is collected using the GPS base receiver 42, as shown by box 122. The spatial position data from the GPS receiver 24 and the GPS base receiver 42 is then differentially post-processed as shown by box 124. The differentially processed GPS data and the INS spatial position data is correlated as shown by box 126, errors in the INS position data are corrected, and the GPS and INS position data is combined as shown by box 128.

Next, the offset between the spatial position of the vehicle 11 and the street centerline is calculated as shown by box 132 using the images on the collected video tape 130. Street centerline points are then plotted on a computer-aided design display system as shown by box 136. Street segment nodes from a TIGER/Line file 134 are updated as shown by box 138 and the updated street segment nodes allow new street segments to be created as shown by box 140. Shape points are then calculated for the street segments as shown by box 142 and a video image-segment relationship is established as shown by box 144. This provides a complete data file 146 containing accurate, updated street segments having a known relationship with the recorded video images. Each of these steps is more completely described below.

The United States Department of Defense intentionally introduces errors into the NAVSTAR satellite information provided by each satellite, which results in position data inaccuracies. This error is removed prior to processing the collected information by differential processing of the position data acquired by the known position GPS base receiver 42 with that of the vehicle-based GPS receiver 24. The position data recorded by the GPS base receiver 42 is indexed by GMT time code and is correlated with the position data recorded by the GPS receiver 24 through the use of the GMT time codes. Differential processing yields a corrected three-dimensional spatial position of the GPS receiver 24 in terms of latitude, longitude and elevation for each position at which a GPS reading was taken.

Once an absolute position for each GPS reading is determined, the recorded relative position data from the INS 28 can be converted into absolute spatial position data in terms of latitude, longitude and elevation. These absolute positions are then combined with the recorded pitch, roll and yaw of the vehicle to form a completed data file of accurate six-dimensional spatial positions which can be referenced by date, SMPTE time code, GMT and run. During this processing, the INS position data is corrected when discrepancies exist between the position data provided by the INS 28 and that provided by the GPS receiver 24. When this occurs, the position data provided by the INS 28 is corrected by prorating the error found in speed and direction at the discrepant point back through the records to the previous GPS positional reading.

After the data collection and post-processing is completed, the information is ready for visual data correlation and extraction. This extraction process is performed entirely after both the data collection process and the data post-processing. By separating the collection, post-processing and extraction processes, a greater amount of data can be captured and a greater amount of information extracted than if they were performed simultaneously. The information on which the extraction process is performed includes the video images recorded by the video tape recorder 20, the six-dimension, absolute spatial positions of the vehicle 11, and the record of pause and resume commands.

A file containing the absolute spatial positions of the vehicle 11 along with the corresponding SMPTE time codes is loaded into a computer-aided design (CAD) display system which is not shown. The display system plots the X and Y coordinates of each spatial position recorded in the file as a point. The spacing between the points varies based on the velocity of the vehicle 11 and the visual trail of plotted points defines the true path of the vehicle 11. Generally, the vehicle 11 travels to one side of the center of the street. Further, the spatial position data is collected relative to a single point within the vehicle 11. Therefore, the collected spatial position data does not relate directly to the true center of the street and the offset of the vehicle 11 from the actual center of the street must be calculated to determine the true center of the street.

To determine the centerline of the street, an operator combines the display of plotted points representing the true spatial position of the vehicle 11 with a display of either the front or rear facing video images. The front or rear facing video image that corresponds to each plotted point can be recalled through a random access procedure through the use of the known SMPTE time code for each point. The operator selects the first plotted point in the segment and displays the corresponding video image in a digital video computer display window. The two views are calibrated to place the center of the video image directly in line with the line of travel of the vehicle 11. A line representing an imaginary projection from the video image source is displayed on the video display as a graphical cursor. This cursor can be moved left or right by a control interface such as a computer mouse or trackball. The distance between the cursor and the graphical image vertical center is measured in terms of the number of pixels. The distance in pixels is translated to a distance in feet, using known information about the video source mounting and focal length. This distance in feet is the distance that the true vehicle position is offset from the center of the street and can be used to calculate the spatial position of the center of the street that corresponds to the vehicle position.

Figure 8:
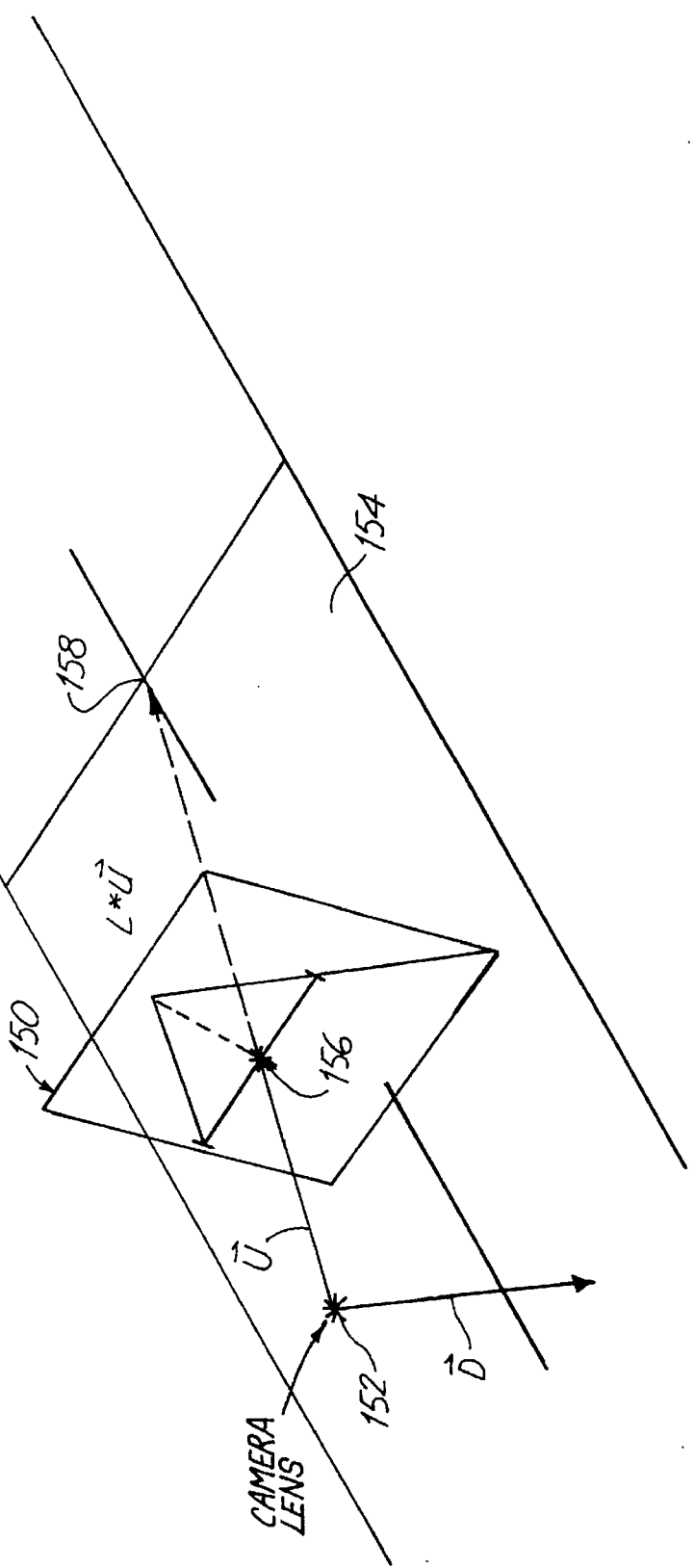
FIG. 8 shows the manner in which a portion of a street centerline is determined.

The centerline determination process is shown in more detail in FIG. 8. A video image 150 taken from a camera lens 152 of one of the cameras 50 is shown as being suspended above a street 154 on which the centerline must be determined for purposes of illustration. A known vector D extends perpendicularly from the camera lens 152 to the surface of the street 154 and is defined in terms of a camera coordinate system that has its origin at the camera lens 152. Using a pointing device, a pixel 156 on the centerline in the video image 150 is chosen by an operator and a vector U is defined in coordinates from the camera coordinate system as extending from the camera lens 152 to the pixel 156. A multiplier L is then found for the vector U such that L*U extends to a point 158 in the plane of the surface of the street 154. The multiplier L is determined using the following equation:

$$L = \frac{\|D\|^2}{U \cdot D}$$

Once the multiplier L is found, the vector L*U is determined. The vector L*U, which is defined in camera coordinates, is then converted to a global spatial position. This is done through a rotation of L*U to account for the rotational differences of roll, pitch and yaw between the camera coordinate system and the global spatial position and a translation of L*U to account for the offset differences of latitude, longitude and elevation between the camera coordinate system and the global spatial position. The converted vector is then used to determine the spatial position of the point 158 on the centerline.

When there is no marked centerline in the street, a pointing device with two additional markers can be used. The additional markers are equally spaced on either side of the centerline marker as equal distances forward of the vehicle 11. The width of the space between the two markers can be controlled to allow an operator to track the edges of the street. A computer automatically determines the point on the video image 150 of the street to which the vector U from the camera lens 152 should extend.

When performed for each plotted point in a street segment, the centerline determination process generates a set of latitude, longitude and elevation coordinates representing the true street centerline. Once this process has been repeated for each point, a street centerline for the segment can be displayed on the CAD system. This process further takes into account changes in the location of the vehicle 11 relative to the street centerline as the vehicle 11 travels down the street, including those caused by traffic and obstructions. This centerline determination or offset calculation process is performed until a street centerline location has been calculated for each collected spatial position of the vehicle 11.

A street segment is a set of ordered spatial positions, each of which is connected to an adjacent position, representing an approximation of a street centerline. Generally, street segments are defined in terms of two such spatial positions, known as a begin node and an end node, which represent the ends of the segment. To help further define curved street segments, a set of intermediate positions known as shape points are usually chosen between the begin and end nodes. Street segments that are straight generally do not require shape points. Street segments are initially defined from U.S. Census Bureau two dimensional TIGER/Line files and each segment is uniquely identified based on a TIGER/Line file identification code called a TIGER/Line Identifier (TLID).

Figure 9:
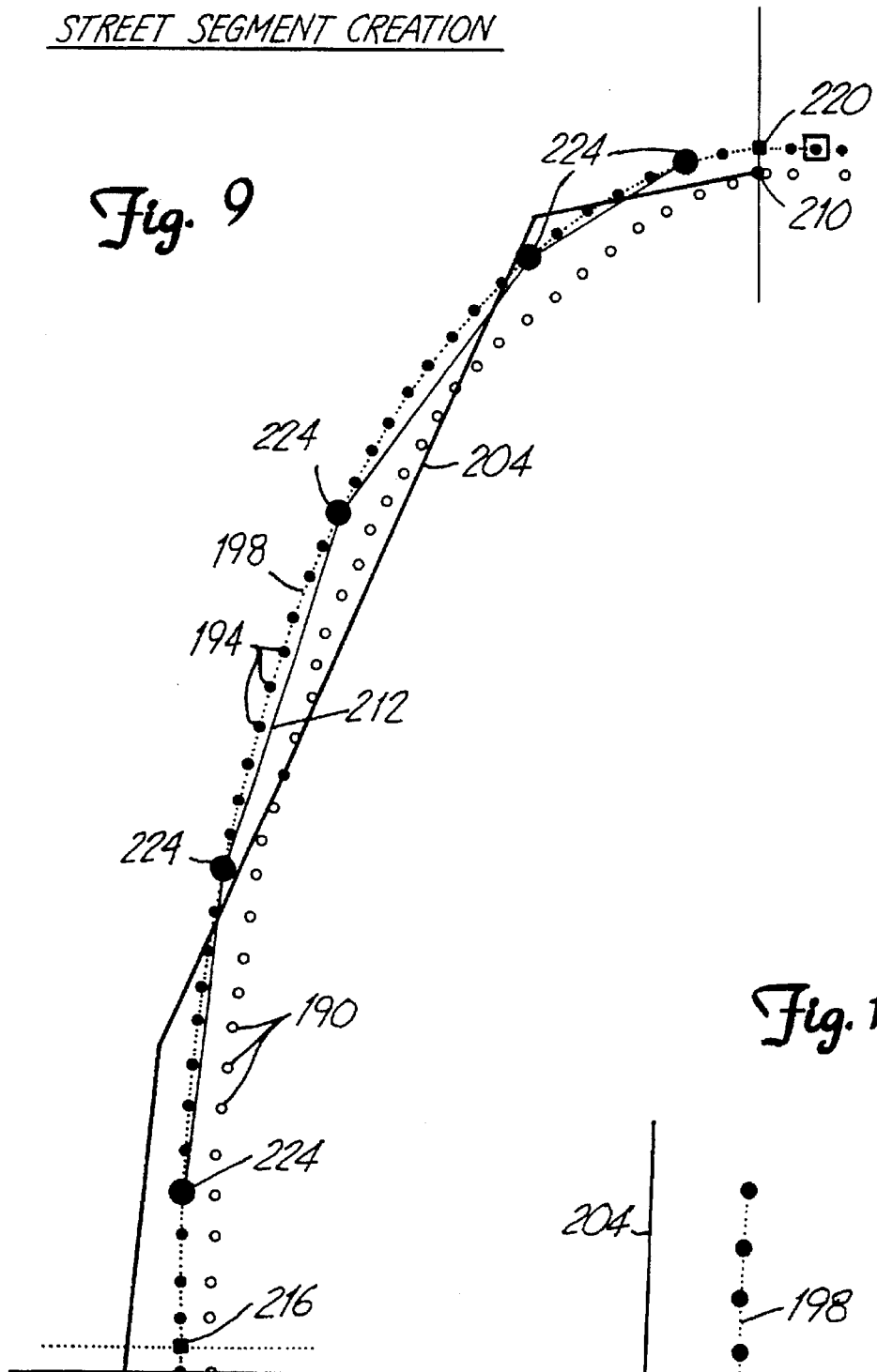
FIG. 9 shows a street segment created according to the method of the present invention.
Figure 10:
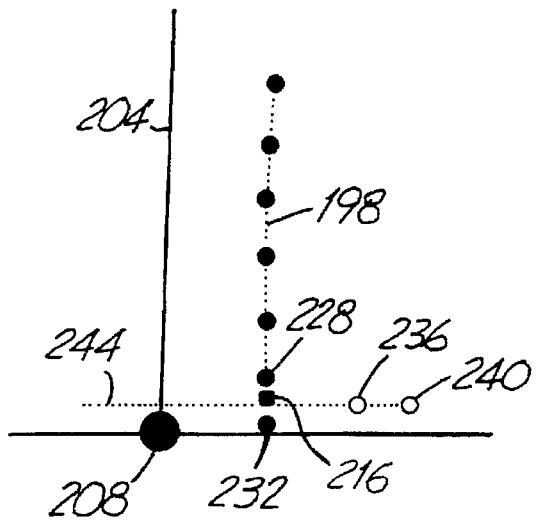
FIG. 10 shows a portion of a street segment created according to the method of the present invention.

FIGS. 9 and 10 illustrate the process of updating a street segment. Referring to FIG. 9, a plurality of plotted points 190 is shown representing a set of spatial positions collected on a single street segment. A plurality of centerline position points 194, each of which is calculated from one of the plotted points 190 using the centerline determination process described above, comprise a centerline 198. A TIGER/Line street segment 204 having a begin node 208 and an end node 210 is also shown in FIG. 9, along with an updated street segment 212 having a new begin node 216, a new end node 220 and a plurality of shape points 224.

After the completion of the centerline determination process, the street segment approximating the calculated centerline position points 194 is retrieved from a U.S. Census Bureau TIGER/Line file and is displayed on the CAD on top of the calculated street centerline 198. Because the TIGER/Line street segments are generally not very accurate approximations of newly calculated street centerlines, the TIGER/Line street segment 204 must be updated. This is done by relocating the begin node 208 and the end node 210 of the TIGER/Line street segment 204 and defining the shape points 224 to be used in the updated street segment 212.

FIG. 10 shows the relocation of the TIGER/Line segment begin node 208. Two points 228 and 232 from the centerline 198 define a first vector which is mathematically projected toward a second vector defined by points 236 and 240 from an intersecting street centerline 244. The mathematical intersection of these two vectors is determined and defines the latitude and longitude of the new begin node 216 for the updated street segment 212. An elevation value of the new begin node 216 is interpolated from a vertical intersection of the two vectors. The end node 210 of the TIGER/Line street segment 204 is relocated in the same manner as the begin node 208, thus defining the new end node 220 for the updated street segment 212 in terms of latitude, longitude and elevation. After the begin and end nodes 208 and 210 of the TIGER/Line segment 204 have been updated, the node location attributes in the TIGER/Line file are updated. Because each node acts as both the begin node and end node for several street segments, a number of segments are updated with the relocation of each node.

Referring to FIG. 9, once the begin and end nodes 208 and 210 of the TIGER/Line street segment 204 have been relocated, the centerline position points 194 between the new begin node 216 and the new end node 220 are statistically evaluated based on a deflection and distance formula to select the shape points 224 that will be used to graphically represent the updated street segment 212. The use of a few shape points 224 rather than the large number of centerline position points 194 facilitates the efficient storage of the graphical database. A graphical display of the redefined street segment 212 having five shape points 224 is shown in FIG. 9.

After the segment updating process has been completed, the segment database record is updated with reference to the new shape points 224 by means of the standard TLID. This provides backward compatibility with all other TIGER/Line information. This process is repeated for all segments that were driven in the run. In addition to updating the segment location information, the run identifier and SMPTE time code for the new begin and end nodes 216 and 220 of the updated segment 212 is added to the segment database. This additional information provides the reference necessary to provide access to the digital video file. Through direct random access to the video file, a new digital video file is created for each view captured in a street segment. The run identifier and beginning SMPTE time code provide a way to uniquely identify each group of recorded video images for each street segment.

Once the physical street segment topology is defined, the video image sequences are associated with each street segment. Each video sequence is defined by a vehicle run identification number as well as a beginning and ending video frame SMPTE time code. By identifying each video sequence in this manner, a unique set of video images can be recalled for each segment. A video source sequence number is also stored to further define individual video sources within each interleaved video segment. The video source sequence number is the position in the video recording cycle of the beginning video image for the segment. This information, along with the video recording sequence noted in the run database, allows the video source to be determined for any SMPTE time code within the segment video range.

A video image to segment matching process is used to match each street segment with at least one video image. Video image position information is used to find the video images which are geographically closest to both the begin node and the end node of a segment. First, a street segment having a known identifier is selected by an operator. The operator then selects a centerline position point within the segment. Using the SMPTE time code of the selected centerline position point, and working sequentially in both directions, each centerline position point at which a video image was recorded is compared to the begin node and the end node until the closest geographical match is found for each node. The SMPTE time codes for these two video frames are recorded as part of the video-segment relationship.

The lower of the two recorded time codes is compared to the pause and resume records from the original vehicle run to determine the subset of video frames in which the segment was recorded. From the start of this subset, the known recording cycle is used to calculate the video source sequence number for the segment. If the lower of the two recorded time codes is associated with the begin node, then the video images associated with the segment were taken in the direction of the street segment. If the lower of the two recorded time codes is associated with the end node, then the video images associated with the segment were taken in a direction opposite to the direction of the street segment. The video-segment direction relationship is recorded as part of the video-segment relationship.

After the video-segment relationship is formed, the video sequences and street segments can be used for a variety of applications. In one such application, random digital video access techniques are used to reassemble the video sequence for a segment into a plurality of smaller video image sets containing sequential video images from a single video source. Each such image set is identified by run, video source and beginning SMPTE time code. A cross reference table is constructed to reference each image set with its associated street segment identifier. By reducing the large set of recorded digital video images into smaller sequences that are associated with street segments, maximum flexibility in data storage is provided. Through this street segment database, large amounts of digital video image sets can be manipulated and using current indexing methodology, up to $10^{14}$ street segments can be managed.

The integration of video images with a geographic information system (GIS) requires multiple access methods for effective use in a GIS environment. To meet this requirement, both a set of segment-video and video-segment relationships is established and used to form a database. In addition, a number of secondary relationships are established from these video-segment and segment-video relationships to permit a wide variety of GIS applications.

Figure 11:
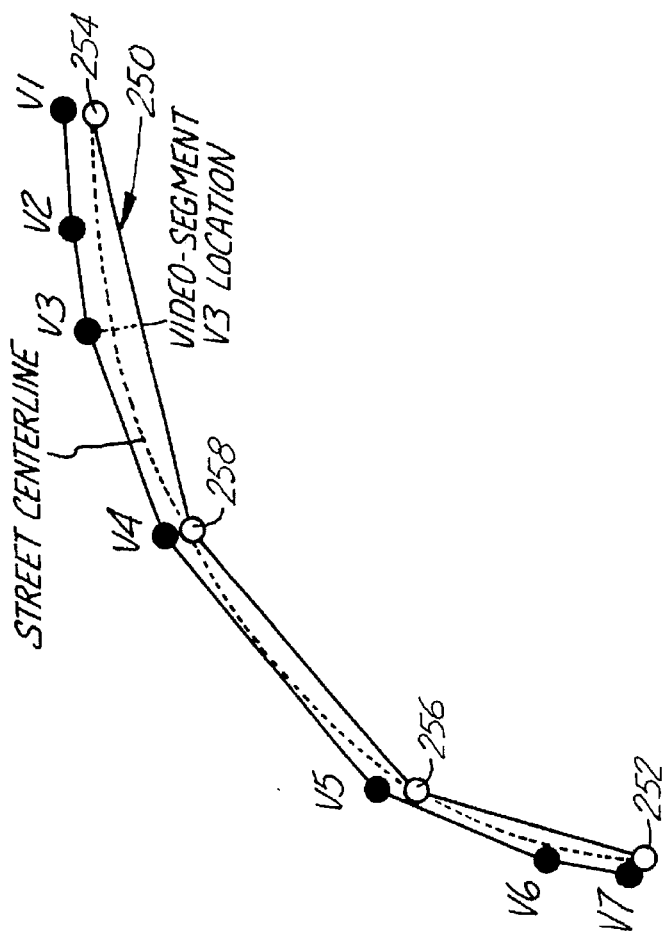
FIG. 11 shows the relationship between a series of recorded video images and a street segment.

FIG. 11 helps illustrate the creation of a video-segment relationship and shows a street segment 250 having a begin node 252 and an end node 254. A first intermediate shape point 256 and a second intermediate shape point 258 are shown and are used to help define the segment 250 and are directly related to the begin and end nodes 252 and 254. A series of video images are shown as points V1–V7 and each has a known position defined in terms of latitude, longitude, elevation, roll, pitch and yaw. Video image V1 is directly related to the end node 254 and video image V7 is directly related to the begin node 252 through the matching process described above. The remaining video images are indirectly related to the begin node 252, the end node 254 and the shape points 256 and 258.

The indirect relationship between the remaining video images and the shape points 256 and 258 is shown in the following example. The video image V3 can be defined in terms of the segment 250 as the perpendicular intersection between the end node 254 and the second shape point 258. This point of intersection can be described in absolute latitude, longitude and elevation or it may be expressed relative to the end node 254 as the negative distance from the point of intersection to the end node 254. The relative position of video image V3 may also be expressed as the positive distance from the begin node 252 to the point of intersection which is equal to the distance from the begin node 252 to the first shape point 256 plus the distance from the first shape point 256 to the second shape point 258 plus the distance from the second shape point 258 to the point of intersection.

Because the relationship between the video points V2–V6 and the begin node 252, end node 254 and shape points 256 and 258 is an independent one, a new relationship can easily be established if subsequent video and positional data were collected for the same segment. The new relationship may be established between any new video points and the existing shape points 256 and 258 by establishing a new video to begin node 252 and video to end node 254 relationship and calculating the point of intersection as described above. In other words, once the street segment, including the begin node, end node and shape points, has been established, it does not need to be updated and subsequent video images can be related to the segment in the same manner as were video images V1–V7.

By creating a direct relationship between each node and the closest video image, a segment-video relationship is also created. As a result of this relationship, an ordered set of video images are associated with any given segment. This allows easy access to a set of video images and related attribute information for any given segment. Therefore, a segment position point described as a position relative to a begin node or an end node can be expressed as an absolute position in terms of video image positions. It is therefore possible to determine the closest video image to any given segment position, providing a user with the ability to examine a visual representation as well as related attribute information of a given position. As with the video-segment relationship, the video image positions are independent from the segment nodes and intermediate shape points. Therefore, the segment positions can be correlated in the same manner with video and positional information collected during subsequent runs.

Figure 12:
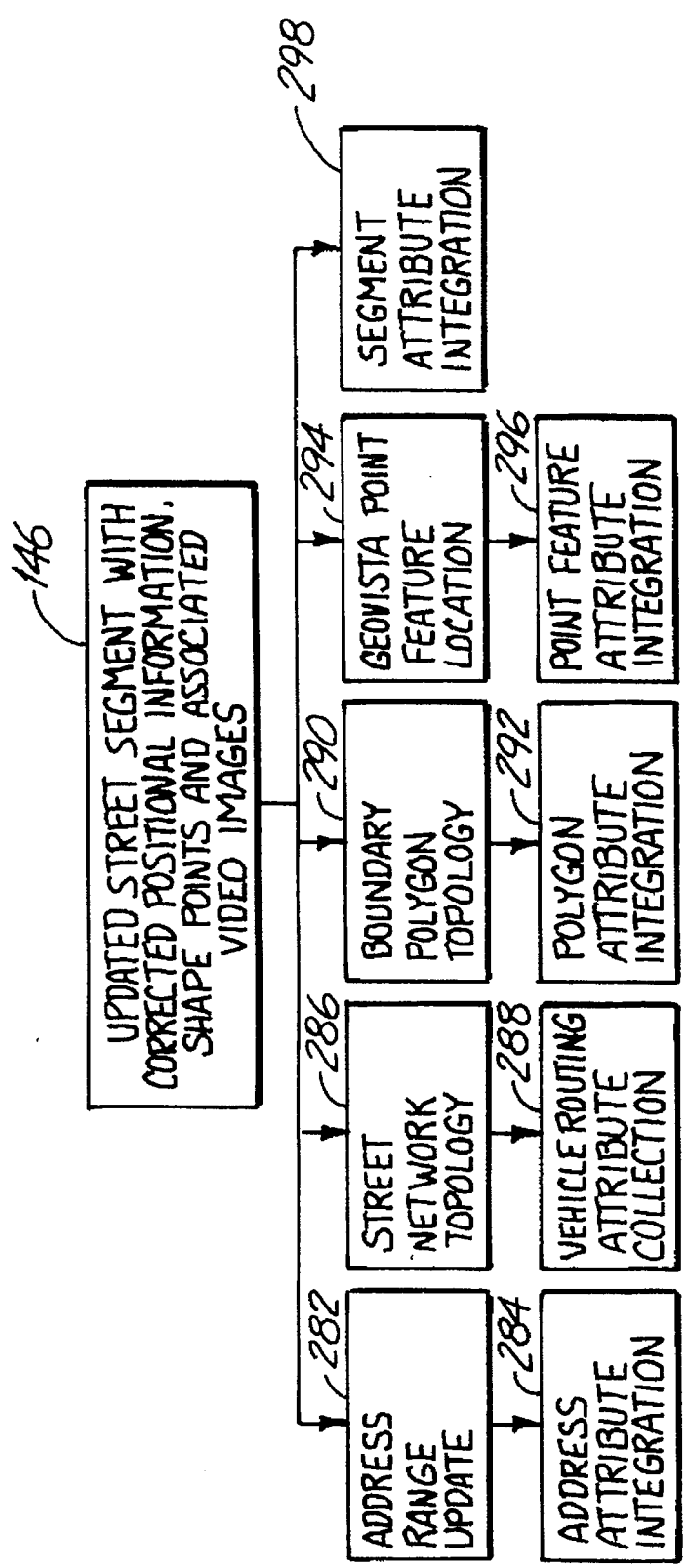
FIG. 12 is a schematic diagram showing a number of ways in which updated street segments can be used.

A number of applications in which the updated street segment and video-segment relationship data 146 can be used are shown in FIG. 12. The applications include the creation and update of address ranges 282 and the integration of address attribute information 284, the creation and maintenance of street network topologies 286, the collection of vehicle routing information 288, the creation and maintenance of boundary polygon topologies and attributes 290 and 292, the accurate location of point features and their attributes 294 and 296, and the integration of street segment attributes with other GIS systems 298. These applications are discussed in more detail below.

Attributes shown in a video image have an extended indirect relationship with segment positions. For example, a street address has an indirect address-segment relationship. By taking this relationship in combination with the indirect segment-video relationship, an address-video relationship can also be established. With such a relationship, an address seen in a video image can be compared to a calculated street address. If the two addresses are not the same, the visually observed address can be used to correct the model by which the address was calculated.

Another example of the use of an extended relationship is in vehicle routing where the efficient collection of vehicle routing information is greatly enhanced by the video-segment data relationships. Vehicle routing information is divided into the two categories of node attribute information, which defines the relationship between two segments through a node, and segment attribute information, which defines the characteristics of the segments. By coupling these two sets of data with GIS based routing software, accurate vehicle navigation or routing can be accomplished.

Node attribute information is collected through a visual examination of the recorded video images for each intersection. Each passage through an intersection is stored as a movement from a specified segment, through a specified node, to another specified segment. Using segment-video data relationships, an operator recalls the video images from any location around a node. The recalled video images are then visually inspected to determine the existence of a segment to segment connection as well as any traffic restrictions or controls. An indexed node attribute database is created to store all of this information for later reference.

In the collection of segment attribute information, the video images for each segment are visually reviewed and evaluated for speed limits, street type classification, one way status, weight or height restrictions, and other traffic controls. Each of these attributes is stored in a segment attribute database as a begin/end range with a left or right orientation. For example, a short no parking zone could be described as an attribute from a relative location X on the segment to the end of the segment and on the appropriate side of the street.

Extended relationships can also be used to determine relative point positions which are points that are referenced to an attribute which is related to a segment. To determine a relative point position, a set of attributes must already exist and be linked to a segment by an attribute-segment relationship. The attribute to which the point is referenced can be visually verified by viewing the closest video image. Another type of point position is direct video position, which is the direct association of attribute data with the video frame identifier of the video image on which the attribute is found.

The absolute position of a point can be found through the use of terrestrial photogrammetry. In photogrammetry, multiple images containing a single chosen reference point are used to triangulate the position of the point relative to the cameras taking the images. This relative position is then used in combination with the known position of the cameras when the image was recorded to determine the absolute position of the chosen point. Once the absolute position of the point is determined, related attribute information can be visually determined and recorded. To help ensure the accuracy of the photogrammetric process, camera characteristics such as lens calibration information as well as specific camera mounting and orientation information must be taken into account.

The present invention allows the photogrammetric process to be performed using any two images containing the chosen reference point. This is possible because the six-dimensional spatial position of each camera is known and recorded for each video image taken. Therefore, the distance between where the two images were taken is known along with the orientations of the cameras from which the images were taken. The present invention thus allows the position of a chosen reference point to be determined through the use of images taken from cameras that are not in the same plane as well as through the use of multiple images from one camera. The performance of the photogrammetry process using images from a variety of cameras is aided through the use of interleaved image storage on the video tape. Further, the performance of the photogrammetry process using images from a variety of cameras allows positions to be calculated after the data collection process is completed.

The ability to perform the photogrammetric process using images from any two cameras is a significant improvement over the traditional stereo photogrammetric approach. Such a traditional approach must compensate for a relatively short baseline between two cameras by using high resolution digital cameras, which requires extraordinarily large amounts of data to be stored. Further, when computing the position of a point or an object which is a great distance from the cameras, as must often be done in the stereo photogrammetric approach, the potential for error in calculating the position of the object is greatly increased. The present system, by allowing the use of any two images in which an object is found, allows the position of the object to be computed using images in which the object is relatively close to the camera.

With the present invention, an accurate address database can be created and an existing database such as a TIGER/Line file can be updated. In addition, a database can be created using information collected and processed by the method of the present invention which allows the retrieval of video images associated with a street address.

All segments created through the process described above are referenced by a TIGER/Line identification number. This referencing method provides a unique identifier for all street segments in the United States. Further, new streets can be added to the database in compliance with the TIGER/Line identification system. Thus, street segments created through the update process described above can be directly related with a TLID. This relationship allows references to be made to all the data elements contained in the TIGER/Line file, allowing for total compatibility of the database provided by the present invention with this national standard.

Each TLID contains an overall address range for the street segment it represents which is known as a nominal address range. In addition, each TLID supports both a left address range and a right address range as well as multiple sub-ranges. Each TLID is referenced to the coordinates of a node at each end of the street segment it represents. The coordinates of the node are used as a beginning point for the address range within the street segment. Therefore, the beginning address in each nominal address range is assumed to be located in the middle of a street intersection. For any specific street address, only one possible position may exist in the database.

Address parsing is possible using the database provided by the present invention. Address parsing converts a user supplied address to a standard address within the database by matching it to a real address range in the database. This address range is referenced to a segment TLID, a relative TLID offset from one of the segment nodes and a side of the street. The side of the street on which an address is located is known as the parity of the address.

Address ranges are stored internally as an offset from the beginning of each street segment. For instance, the beginning segment node is considered to have a position offset of zero while the ending segment node is referred to as having an offset of one. The coordinate position of an address is based on the offset which is determined by taking the total segment length as defined by the shape points and prorating the distance along the segment. For each address, there will therefore be a pair of coordinates and a parity for the true address position.

A video image can be recalled for any coordinate pair through the use of a coordinate-video image matching system. The video information is independent from the spatial position information and video frame calculations rely on the segment-video relationship discussed above. This process allows the retrieval of the nearest video image to a coordinate pair.

An address range can be constructed after the street segment update process. The nominal address ranges are acquired from the TIGER/Line file for each street segment. The video for a given segment is displayed and a determination is made whether to insert an additional address range. Address matching is accomplished through the use of the information found in the TIGER/Line files prior to the address range construction. This information includes the identifiers for both the begin node and the end node of each segment, which contain the actual coordinates of the end points of the segment. Any shape points that are connected to the begin and end nodes to define the segment would also be accessed. Based on the node and shape points, the length of the segment is calculated. The information found in the TIGER/Line files also includes the beginning and ending address ranges that define the nominal address range for each segment.

The address range construction process begins by viewing the video for a segment. As an address is observed, the video frame on which it is observed is converted to image coordinates. The actual offset from the begin node is then determined through the video-segment relationship. The operator indicates whether the address is an exception to the anticipated range value. If the address is not an exception, the parity of the address is automatically recorded based on the camera view being observed. The raw information is then tabulated and includes for each address; the offset from the begin node, whether the address is an anticipated range value or an exception, the predicted parity, and the actual parity.

A nominal range within a segment may be split by inserting additional range or exception points. This most frequently occurs when new streets are added. If the new street is perpendicular to an existing street, then the existing street is split and two new TLIDs are created for the split street using the TLID offset generated by the new node created by intersection with the new street. The operator will then set new nominal address ranges for the two new street segments and the old segment address ranges will be reassigned to the proper new segment TLID. A TLID for the new street will be created and address ranges will be processed similar to the initial TLID processing.

While the collection system 10 was described as having a single GPS receiver 24, the present invention may be operated with two or more GPS receivers or with a GPS receiver having multiple antennas. Such a configuration might be desirable to provide a more frequent update of the vehicle position if a lower quality gyroscope is used in the INS 28. The update could then be used to more frequently correct any errors in the readings provided by the INS 28. Further, the collection system 10 can utilize a GPS receiver that is capable of providing its spatial position with six degrees of freedom. Spatial position information can also be provided by other devices such as odometers and pressure gauges and can be correlated with the spatial position data provided by the GPS receiver 24 and the INS 28.

The position of each camera was described as being known through the use of the recorded spatial positions of the vehicle 11. However, it is also possible to determine the position of a camera by using any three images of the same object captured at GPS coordinates not in a straight line. The information provided by three such images would be sufficient to determine the six-dimensional position of the camera, thus allowing photogrammetric analysis to be performed.

While the collection system 10 was described as having only one video tape recorder 20, the system 10 can be configured to operate two or more video tape recorders. Further, the collection system 10 can be located on or in any moving platform, including a platform capable of being carried by a single person.

Although the present invention has been described with reference to preferred embodiments, workers skilled in the art will recognize that changes may be made in form and detail without departing from the spirit and scope of the invention.

What is claimed is:

1. A method for collection of visual and spatial position information from a moving platform, the method comprising:

obtaining spatial position data relating to spatial position and orientation of the moving platform;

obtaining video images from a plurality of video cameras carried by the moving platform at known positions and orientations with respect to the moving platform;

recording non-coplanar video images obtained at different times from the video cameras;

associating with each recorded video image an instantaneous spatial position and orientation of the video camera which produced the video image at the time that the video image was obtained, based upon the spatial position and orientation of the moving platform and the known position and orientation of the video camera with respect to the moving platform; and determining location of an object shown in at least two of the recorded non-coplanar video images obtained at different times based upon a location of the object in each of those recorded images and the associated spatial positions and orientations of the video cameras which produced those video images.

2. The method of claim 1 wherein the video images are recorded in a sequential cycle.

3. The method of claim 1 wherein the spatial position data includes data obtained from a receiver located on the moving platform and capable of receiving data from Global Positioning System satellite.

4. The method of claim 3 wherein the spatial position data further includes relative spatial position data obtained from an inertial navigation system located on the moving platform.

5. The method of claim 1 wherein operation of the video cameras is synchronized.

6. The method of claim 1 and further comprising:

associating with each recorded video image the time at which that video image was obtained.

7. The method of claim 1 wherein the plurality of video cameras are positioned and oriented to capture video images in front, behind, and on each side of the moving platform.

8. The method of claim 1 and further comprising:

replacing selected data in a geographic information system database, based upon the recorded video images and associated spatial position and orientation of the video cameras which produced the video images.

9. The method of claim 8 wherein the database includes data relating to spatial positions of a plurality of street segments.

10. The method of claim 9 wherein replacing selected data includes replacing data relating to a beginning and an end of a selected street segment.

11. The method of claim 1 wherein the moving platform is moved along streets, and wherein the method further comprises:

matching street segments to at least one video image based upon the spatial position and orientation of the video camera associated with that video image.

12. An apparatus for collection of visual and spatial position information, the apparatus comprising:

a moving platform;

means located on the moving platform for obtaining spatial position data relating to spatial position and orientation of the moving platform;

a plurality of video cameras located on the moving platform, the video cameras being positioned at known locations and orientations with respect to the moving platform and being oriented to capture images of fields of view in front, behind, on a left side and on a right side of the moving platform;

means for recording non-coplanar video images obtained at different times from the video cameras;

means for associating each recorded video image with an instantaneous spatial position and orientation of the video camera which produced the recorded video image at the time that the video image was obtained, based upon the spatial position data relating to the spatial position and orientation of the moving platform and the known position and orientation of the video cameras with respect to the moving platform; and means for deriving spatial position information relating to an object appearing in at least two of the recorded images obtained at different times from the video cameras from (a) a location of the object in each of the recorded images, and (b) the instantaneous spatial position and orientation of the video camera which produced each recorded video image at the time that video image was obtained.

13. The apparatus of 12 wherein the means for obtaining spatial position data includes a receiver capable of receiving data from global positioning system satellites.

14. The apparatus of 13 wherein the means for obtaining spatial position data further includes an inertial navigation system.

15. The apparatus of 14 and further comprising:

synchronizing means for synchronizing operation of the video cameras.

16. A method for collection of visual and spatial position information from a moving platform, the method comprising obtaining spatial position data relating to spatial position and orientation of the moving platform;

obtaining video images from a first video camera carried by the moving platform at a known position and orientation with respect to the moving platform to capture images of a first field of view in front of the moving platform;

obtaining video images from a second video camera carried by the moving platform at a second known position and orientation with respect to the moving platform to capture images of a second field of view behind the moving platform;

obtaining video images from a third video camera carried by the moving platform at a known position and orientation with respect to the moving platform to capture images of a third field of view on a left side of the moving platform;

obtaining video images from a fourth video camera carried by the moving platform at a known position and orientation with respect to the moving platform to capture images of a fourth field of view on a right side of the moving platform;

recording a sequence of non-coplanar video images obtained at different times from the first, second, third, and fourth video cameras;

associating with each recorded video image an instantaneous spatial position and orientation of the video camera which produced that video image at the time that the video image was obtained, based upon the spatial position and orientation of the moving platform and the known position and orientation of that video camera with respect to the moving platform; and determining location of an object shown in at least two of the recorded non-coplanar video images obtained from different ones of the first, second, third, and fourth video cameras.

* * * * *

UNITED STATES PATENT AND TRADEMARK OFFICE
CERTIFICATE OF CORRECTION

PATENT NO. : 5,633,946

DATED : MAY 27, 1997

INVENTOR(S) : THEODORE M. LACHINSKI, LOUIS S. PTACEK, PAUL M. BLAIS, STEPHEN BOGGS, JOHN W. LONGFELLOW, JEFFREY M. SETTERHOLM

It is certified that error appears in the above-indentified patent and that said Letters Patent is hereby corrected as shown below:

On the title page [56] Reference Cited OTHER PUBLICATIONS, delete second occurrence of reference "The Ohio State University, GPS/Imaging/GIS Project, Dec. 1, 1991."

Col. 5, line 2, delete "trait", insert --unit--

Signed and Sealed this

Sixth Day of January, 1998

Attest:

Attesting Officer

BRUCE LEHMAN

Commissioner of Patents and Trademarks

(12) EX PARTE REEXAMINATION CERTIFICATE (9031st)
United States Patent
Lachinski et al.

(10) Number: US 5,633,946 C1
(45) Certificate Issued: May 29, 2012

(54) METHOD AND APPARATUS FOR COLLECTING AND PROCESSING VISUAL AND SPATIAL POSITION INFORMATION FROM A MOVING PLATFORM

(75) Inventors: Theodore M. Lachinski, Andover, MN (US); Louis S. Ptacek, Mound, MN (US); Paul M. Blais, St. Paul, MN (US); Stephen Boggs, Fridley, MN (US); John W. Longfellow, St. Paul, MN (US); Jeffrey M. Setterholm, Lakeville, MN (US)

(73) Assignee: Geospan Corporation, Bloomington, MN (US)

Reexamination Request:
No. 90/011,386, Jan. 27, 2011

Reexamination Certificate for:
Patent No.: 5,633,946
Issued: May 27, 1997
Appl. No.: 08/550,553
Filed: Nov. 3, 1995

Certificate of Correction issued Jan. 6, 1998.

Related U.S. Application Data

(63) Continuation of application No. 08/246,303, filed on May 19, 1994, now abandoned.

(51) Int. Cl.
*G06K 9/00* (2006.01)

(52) U.S. Cl. .................... 382/103; 348/118; 348/153; 701/532

(58) Field of Classification Search ................. None
See application file for complete search history.

(56) References Cited

To view the complete listing of prior art documents cited during the proceeding for Reexamination Control Number 90/011,386, please refer to the USPTO's public Patent Application Information Retrieval (PAIR) system under the Display References tab.

*Primary Examiner* — Kavita Padmanabhan

(57) ABSTRACT

Visual and spatial position information is collected and processed for the formation of a geographic information database. In addition, the information collected and processed can be used to update the United States Census Bureau TIGER/Line files to improve the accuracy of the files. Information collected and processed can also be used to accurately determine the spatial position of an object seen in the collected visual information. The method includes the high speed collection and correlation of video images and spatial position information.

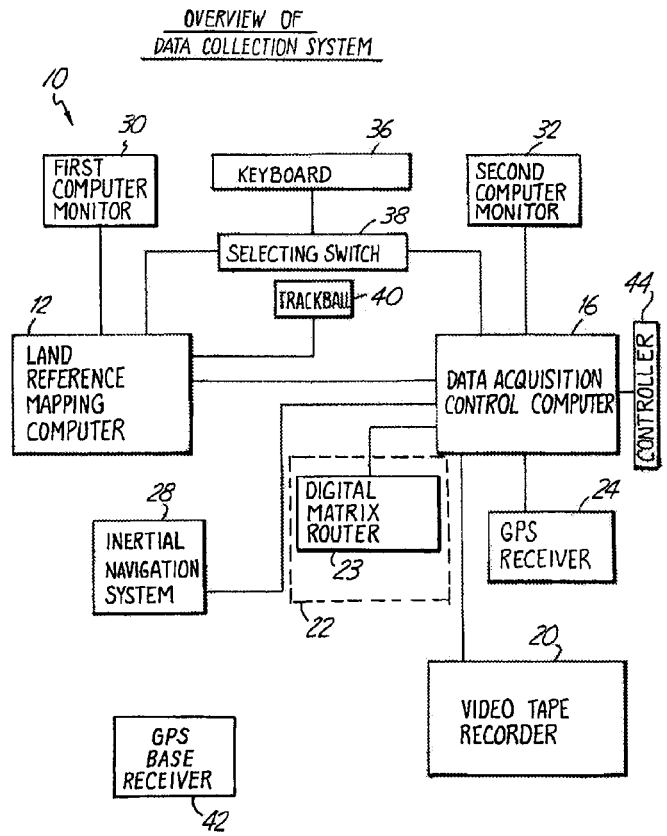

US 5,633,946 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 16 are determined to be patentable as amended.

Claims 3, 4 and 7 dependent on an amended claim, are determined to be patentable.

New claims 17-20 are added and determined to be patentable.

Claims 2, 5, 6 and 8-15 were not reexamined.

1. A method for collection of visual and spatial position information from a moving platform, the method comprising:
   obtaining spatial position data relating to spatial position and orientation of the moving platform;
   obtaining video images from a plurality of video cameras carried by the moving platform at known positions and orientations with respect to the moving platform;
   recording non-coplanar video images obtained at different times from the video cameras;
   associating with each recorded video image an instantaneous spatial position and orientation of the video camera which produced the video image at the time that the video image was obtained, based upon the spatial position and orientation of the moving platform and the known position and orientation of the video camera with respect to the moving platform; and
   determining location of an object shown in at least two of the recorded non-coplanar video images obtained at different times based upon a location of the object in each of those recorded images and the associated spatial positions and orientations of the video cameras which produced those video images, *wherein location of the object is determined without use of stereo photogrammetry.*

16. A method for collection of visual and spatial position information from a moving platform, the method comprising
    obtaining spatial position data relating to spatial position and orientation of the moving platform;
    obtaining video images from a first video camera carried by the moving platform at a known position and orientation with respect to the moving platform to capture images of a first field of view in front of the moving platform;
    obtaining video images from a second video camera carried by the moving platform at a second known position and orientation with respect to the moving platform to capture images of a second field of view behind the moving platform;
    obtaining video images from a third video camera carried by the moving platform at a known position and orientation with respect to the moving platform to capture images of a third field of view on a left side of the moving platform;
    obtaining video images from a fourth video camera carried by the moving platform at a known position and orientation with respect to the moving platform to capture images of a fourth field of view on a right side of the moving platform;
    recording a sequence of non-coplanar video images obtained at different times from the first, second, third, and fourth video cameras;
    associating with each recorded video image an instantaneous spatial position and orientation of the video camera which produced that video image at the time that the video image was obtained, based upon the spatial position and orientation of the moving platform and the known position and orientation of that video camera with respect to the moving platform; and
    determining location of an object shown in at least two of the recorded non-coplanar video images obtained from different ones of the first, second, third, and fourth video cameras, *wherein location of the object is determined without use of stereo photogrammetry.*

*17. A method for collection of visual and spatial position information from a moving platform, the method comprising:*
   *obtaining spatial position data relating to spatial position and orientation of the moving platform;*
   *obtaining video images from a plurality of video cameras carried by the moving platform at known positions and orientations with respect to the moving platform;*
   *recording non-planar video images obtained at different times from the video cameras;*
   *associating with each recorded video image an instantaneous spatial position and orientation of the video camera which produced the video image at the time that the video image was obtained, based upon the spatial position and orientation of the moving platform and the known position and orientation of the video camera with respect to the moving platform; and*
   *determining location of an object shown in at least two of the recorded non-coplanar video images obtained at different times based upon a location of the object in each of those recorded images and the associated spatial positions and orientations of the video cameras which produced those video images, wherein location of the object is determined without capture or use of stereo video images.*

*18. A method for collection of visual and spatial position information from a moving platform, the method comprising*
   *obtaining spatial position data relating to spatial position and orientation of the moving platform;*
   *obtaining video images from a first video camera carried by the moving platform at a known position and orientation with respect to the moving platform to capture images of a first field of view in front of the moving platform;*
   *obtaining video images from a second video camera carried by the moving platform at a second known positon and orientation with respect to the moving platform to capture images of a second field of view behind the moving platform;*
   *obtaining video images from a third video camera carried by the moving platform at a known position and orien-* tation with respect to the moving platform to capture images of a third field of view on a left side of the moving platform;

obtaining video images from a fourth video camera carried by the moving platform at a known position and orientation with respect to the moving platform to capture images of a fourth field of view on a right side of the moving platform;

recording a sequence of non-coplanar video images obtained at different times from the first, second, third, and fourth video cameras;

associating with each recorded video image an instantaneous spatial position and orientation of the video camera which produced that video image at the time that the video image was obtained, based upon the spatial position and orientation of the moving platform and the known position and orientation of that video camera with respect to the moving platform; and determining location of an object shown in at least two of the recorded non-coplanar video images obtained from different ones of the first, second, third, and fourth video cameras, wherein location of the object is determined without capture or use of stereo video images.

19. The method of claim 16, wherein determining location of the object includes using a camera coordinate system that has an origin at a camera lens of one of the first, second, third, and fourth video cameras; selecting a pixel representing the object in a non-coplanar video image produced by that video camera; generating a vector that extends from the origin through the pixel; and converting the vector to global spatial coordinates based upon the instantaneous spatial position and orientation of that video camera associated with that non-coplanar video image.

20. The method of claim 16, wherein determining location of the object includes performing a photogrammetric process using the at least two of the recorded non-coplanar images.

* * * * *